United States Patent [19]

Anderson et al.

[11] 4,108,939

[45] Aug. 22, 1978

[54] POROUS POLYMERIC BEARING

[75] Inventors: Clifford Wilhelm Anderson, Pine Island; Kenneth John Mack, Lake City; Jerry Thomas Martin, Plainview, all of Minn.

[73] Assignee: International Business Machines Corporation, Armonk, N.Y.

[21] Appl. No.: 698,381

[22] Filed: Jun. 21, 1976

[51] Int. Cl.² ............................................. C08L 61/06
[52] U.S. Cl. ................................. 264/129; 260/838; 264/126; 264/162
[58] Field of Search ................... 260/838, 823, 79; 264/122, 125, 126, 129, 162

[56] References Cited

U.S. PATENT DOCUMENTS

| | | | |
|---|---|---|---|
| 3,464,845 | 9/1969 | Osborn | 117/49 |
| 3,574,429 | 4/1971 | Reising | 308/238 |
| 3,600,341 | 8/1971 | Schmidt | 260/823 |
| 3,716,609 | 2/1973 | Trocciola | 264/122 |
| 3,948,865 | 4/1976 | Brady | 264/122 |
| 3,954,932 | 5/1976 | Coale | 260/79 |
| 3,969,307 | 7/1976 | Osborn | 260/79 |
| 3,988,286 | 10/1976 | Edmonds | 260/823 |

*Primary Examiner*—Paul R. Michl
*Attorney, Agent, or Firm*—Robert W. Lahtinen

[57] ABSTRACT

A porous polymeric bearing is formed of a sintered composite of polyphenylene sulfide and a cured condensation thermosetting resin such as a phenolic compound wherein the presence of the thermoset material affords structural support during the sintering of the polyphenylene sulfide and further induces highly interconnected porosity in the fabricated composite adaptable for impregnation with a liquid lubricant. The fabrication includes a curing and degassing of the compressed greenware bearing followed by sintering and a subsequent post cure.

17 Claims, No Drawings

POROUS POLYMERIC BEARING

BACKGROUND OF THE INVENTION

This invention pertains to antifriction bearings and more particularly to a composite organic bearing structure which may be impregnated with a liquid lubricant.

Composite material bearings are well-known. The most common form of such composite material is the use of polytetrafluorethylene (sometimes referred to as "Teflon") with another resin where the "Teflon" provides lubrication and the other material imparts enhanced load carrying capability. Other composite structures are used to provide porosity in which to retain a lubricant. Most such combinations result in noninterconnected porosity that results in cost problems or limited lubricant retaining capability as only those connected voids opening to the surface may be utilized.

High temperature applications have typically required the use of sintered metal or graphite bearings. Metal bearings required finely finished bearing surfaces to avoid metal to metal contact while graphite is brittle and must be machined. Either option requires rather costly machining operations and metal has the further disability of oxidization both with respect to the metal bearing material and the catalyzing effect on the lubricating oil.

SUMMARY OF THE INVENTION

In the present invention polyphenylene sulfide (PPS) is used as the matrix material in a sintered bearing. This material used by itself possesses excellent strength, especially at elevated temperatures, but is costly and lacks both the lubricating qualities and the porosity to permit use with known desirable lubricants. The polyphenylene sulfide is combined with phenolic material which serves to prevent slumping of the PPS during sintering and also induces the formation of highly interconnected porosity or voids adaptable to vacuum impregnation with liquid lubricant.

The process used to fabricate bearings in accordance with the present invention includes mixing the polyphenylene sulfide powder and phenolic compound granules and pressing a measured quantity into a greenware bearing form. The greenware part may then be placed on a shaft to maintain the desired internal diameter during subsequent processing. The greenware is then sintered at an initial moderate temperature of approximately 350° Fahrenheit during which time the phenolic component is substantially cured and the material is degassed. Thereafter the greenware is subjected to a higher temperature just below the melting point of the PPS for a longer period during which the sintering of the thermoplastic PPS material is completed and any residual curing of the thermosetting phenolic is also completed. During this portion of the process the PPS would be unable to maintain dimensional integrity and would slump unless supported by the presence of the wholly or partially cured phenolic portion of the composite.

When the sintering is completed the parts are cooled, removed from the shaft and post-cured for an extended period at a reduced temperature such as 400° Fahrenheit. This post-cure operation allows for shrinkage that might otherwise occur when subjected to elevated temperature in use. The best practice includes a final machining following the post-cure operation to bring the bearing dimension to a specified value.

In the finished bearing the presence of the phenolic material induces voids or porosity which are highly interconnected for effective introduction of liquid lubricant material. This porosity is vacuum impregnated with an oil such as a paraffin base mineral oil or a fluorosilicone oil depending upon the anticipated operating temperature to which the bearing is expected to be subjected. In service the material of this bearing will not catalyze oil oxidation as may occur when using sintered metal bearings.

DETAILED DESCRIPTION

In practicing the invention, finely comminuted thermosetting phenolic compound is mixed with polyphenylene sulfide (PPS) powder. A wide variation of proportions of the constituents of the mixture may be utilized, but in practice it is anticipated that not more than 70 percent of one of the two ingredients of the mixture will be utilized. When high concentrations of PPS are utilized, the material cost becomes greater and the lubricating ability of the bearing is reduced. Using high concentrations of phenolic compound causes the resulting part to be structurally weaker. Since the presence of the thermosetting phenolic induces highly interconnected porosity in the composite structure (in addition to a structural support during the sintering operation) a mixture closely approximating equal parts by weight of the constituents of the mixture induces the maximum porosity and consequently the maximum ability to accept and retain liquid lubricant to ultimately provide the optimum lubricating value. The varying porosity of bearings of identical size and shape as evidenced by the quantity of oil retained is shown in the following table for differing proportions of polyphenylene sulfide and phenolic compound in the composite bearing material.

TABLE I

| Composition | | | |
|---|---|---|---|
| PPS/Phenolic | 65%/35% | 50%/50% | 35%/65% |
| Bearing Weight (dry) | 5.4 gm. | 3.83 gm. | 4.51 gm. |
| Oil retained | .285 gm. | .984 gm. | .574 gm. |

Although the 50/50 mixture affords the greatest porosity and consequently the lowest density, such bearings when lubricated possess a load carrying capability equivalent to a sintered bronze bearing. The PPS provides a strong matrix in the final sintered bearing structure while the phenolic affords structural strength during the sintering operation while the presence of the cured phenolic in the final bearing structure imparts the interconnected porosity. In addition, the less costly phenolic reduces the cost of the composite structure.

The mixture of the phenolic and PPS materials is pressed into a desired greenware form using a compressive pressure of about 6800 pounds per square inch. A pressure of 6800 psi is selected for compaction as a compromise between an excessively high pressure that would require larger equipment and substantial energy and a low pressure that would leave the greenware parts linsufficiently compacted and too fragile to handle easily before sintering. As a practical limit, the pressure should exceed a minimum of 6000 psi. The phenolic compound can be cured either before or after forming the greenware part. If the part is formed of uncured phenolic compound the greenware is first subjected to a temperature of 350° Fahrenheit for a minimum 15 minutes to substantially cure the phenolic component and degas the material. The temperature is then raised to 540° Fahrenheit which is just below the melting point of the PPS component and the temperature is maintained at that level for one hour to sinter the greenware part. It is during this sintering operation that the phenolic compound functions to maintain the dimensional integrity of the part in process whereas a part composed of 100 percent PPS would slump and permanently deform. Also during the above curing and sintering procedures it is common practice to mount the greenware bearing parts about a shaft to maintain the bearing surface dimensions and character.

Following the sintering operation the bearings are cooled on the shaft and thereupon removed. The sintered bearing elements are then post-cured at 400 degrees Fahrenheit to stabilize bearing dimensions. Such post-cure is necessary to prevent shrinkage in high temperature service from causing the bearing surface to seize a shaft rotating therein. Following the post-cure the bearing is sized by machining the bearing surface to the specified dimension.

The bearings thus fabricated are then vacuum impregnated with a liquid lubricant. The lubricant selected is covered largely by the anticipated service to which the bearing is to be subjected. In lower temperature applications a paraffin based mineral oil is commonly used whereas when higher temperatures must be tolerated a fluorosilicone oil is utilized.

The following examples are illustrative of the present invention and are not intended as a limitation of the scope thereof.

EXAMPLE 1

Phenolic compound is initially cured at 350 degrees Fahrenheit. Thereafter equal parts by weight of the cured phenolic resin and polyethylene sulfide powder are mixed together and a predetermined quantity of such mixture is formed into a greenware part by being subjected to a 6800 pound per square inch forming pressure. The greenware part is then sintered at a 540° Fahrenheit temperature.

EXAMPLE 2

71 percent by weight of phenolic compound and 29 percent by weight of polyphenylene sulfide are mixed for two minutes in a blender and thereafter pressed at a pressure of 6800 pounds per square inch into a greenware bearing part. The greenware part is placed on a shaft and cured at a temperature of 350° Fahrenheit for one-half hour and the temperature thereafter is raised to 540° Fahrenheit for one hour. Following cooling on the shaft, the bearings are removed.

EXAMPLE 3

Equal parts by weight of thermosetting phenolic resin and polyphenylene sulfide powder are mixed and pressed into a greenware bbearing element under a pressure of 6800 pounds per square inch. The formed greenware bearing element is mounted about a shaft and cured at a temperature of 350° Fahrenheit for one-half hour. The temperature is then raised to 530 degrees Fahrenheit for one hour following which the bearing is cooled and removed from the shaft.

EXAMPLE 4

A mixture of 65% by weight of PPS with the balance phenolic resin granules are mixed in a blender for from 2 to 5 minutes. The resulting powder was compressed into a greenware bearing part at a pressure of 6800 pounds per square inch. The greenware part was placed on a shaft and cured at 350° Fahrenheit for one-half hour and thereafter the temperature was raised to 540° Fahrenheit for one hour. After cooling on the shaft, the bearings were removed and post-cured at 400° Fahrenheit for eight hours. Following the post-cure, the bearings were reamed to the final size and thereafter vacuum impregnated with mineral oil.

EXAMPLE 5

Equal parts by weight of phenolic resin and thermoplastic PPS powder were mixed and thereupon pressed into a greenware bearing element at a pressure of 6800 psi. The greenware bearing element was mounted on a shaft and cured at a temperature of 350° Fahrenheit for a half hour. The temperature was then raised to 540° Fahrenheit for one hour following which the bearing was cooled and removed from the shaft. The bearing was then post-cured at a 400° Fahrenheit temperature for eight hours and finally vacuum impregnated with fluorosilicone oil.

While the invention has been particularly shown and described with reference to preferred embodiments thereof, it will be understood by those skilled in the art that the foregoing and other changes in form and details may be made therein without departing from the spirit and scope of the invention.

We claim:
1. An antifriction bearing in which at least the material forming the bearing surface comprises at least two heterogenous interlocked phases of irregular shape; one of said phases being polyphenylene sulfide and the other being a cured phenolic resin; the presence of said cured phenolic resin providing highly interconnected voids within such compounded structure adaptable for impregnation with a liquid lubricant.

2. The bearing of claim 1 wherein said polyphenylene sulfide phase comprises between 30 and 75 percent by weight of said material.

3. The bearing of claim 2 wherein said material voids are impregnated by a liquid lubricant.

4. The method of making a composite polymeric antifriction bearing element comprising
   preparing a mixture containing 30 to 70 percent by weight of powdered polyphenylene sulfide with the balance substantially thermosetting phenolic resin;
   pressing a predetermined quantity of said mixture into a greenware bearing element form at a minimum pressure of 6000 psi;
   curing said phenolic resin in said greenware element form at a temperature below the melting temperature of said polyphenylene sulfide;
   sintering said bearing element by coalescing said polyphenylene sulfide into a continuous matrix at a temperature near the melting temperature of said polyphenylene sulfide; and
   post-curing said bearing element at a temperature below the melting temperature of said polyphenylene sulfide.

5. The method of claim 4 further comprising mixing said polymeric constituents in a blender to obtain a uniform admixture of the constituent particles.

6. The method of claim 5 wherein said greenware element is cured at a temperature between 300° and 400° Fahrenheit for at least 15 minutes.

7. The method of claim 6 wherein the temperatures of said sintering step is from 530° to 550° Fahrenheit.

8. The method of claim 7 further comprising machining the bearing surface of said bearing element to a specified dimension subsequent to said post-curing.

9. The method of claim 8 further comprising mounting said greenware element on a shaft prior to sintering with the bearing surface received about said shaft and retaining said greenware element on said shaft during said sintering step.

10. The method of claim 9 further comprising cooling said bearing element on said shaft following said sintering step and removing said bearing element from said shaft prior to said post-cure step.

11. The method of claim 10 further comprising vacuum impregnating the porosity of said bearing element with a liquid lubricant following said machining step.

12. The method of making a composite polymeric bearing element comprising preparing a mixture containing 30 to 70 percent by weight of powdered polyphenylene sulfide with the balance substantially cured thermosetting phenolic resin;

forming a greenware bearing element by pressing a quantity of said mixture using a pressure in excess of 6000 psi;

sintering said greenware element at a temperature approaching the melting temperature of polyphenylene sulfide; and post-curing such sintered element at a temperature below the sintering temperature.

13. The method of claim 12 wherein the temperature of said sintering step is in the range of 530° to 550° Fahrenheit and the duration of such sintering step exceeds one-half hour.

14. The method of claim 13 further comprising the step of mounting said greenware element on a shaft prior to sintering with the bearing surface received about said shaft and retaining said element on said shaft during said sintering step.

15. The method of claim 14 further comprising the steps of cooling said bearing element on said shaft following said sintering and removing said bearing element from said shaft prior to said post-cure.

16. The method of claim 15 further comprising machining the bearing surface of said bearing element to a specified dimension subsequent to post-curing.

17. The method of claim 16 further comprising vacuum impregnating the porosity of said bearing element with a liquid lubricant following said machining step.

* * * * *